Figure 1:
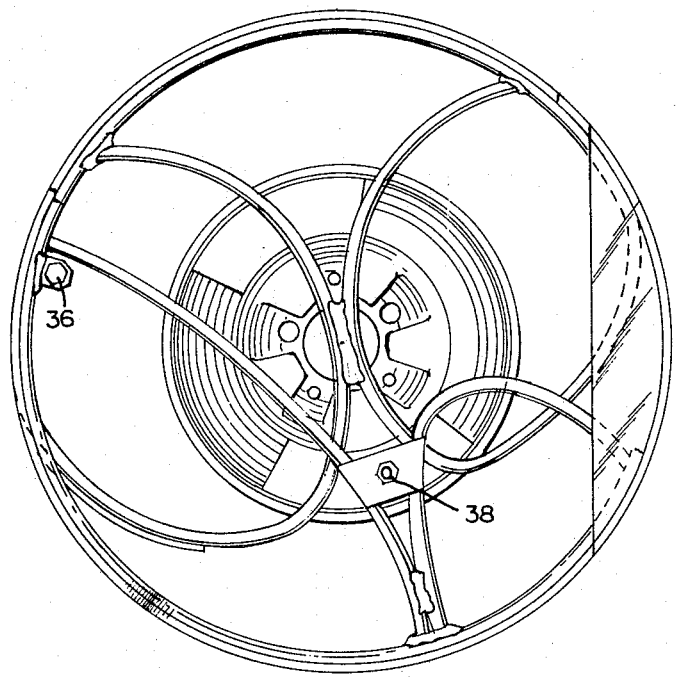

INVENTOR
JOSEPH F. PERRY

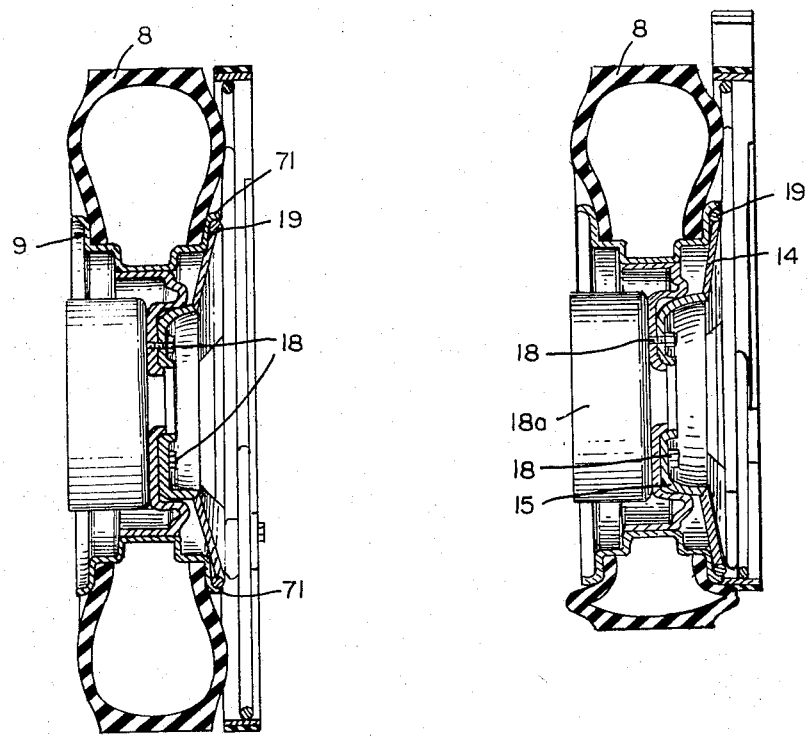

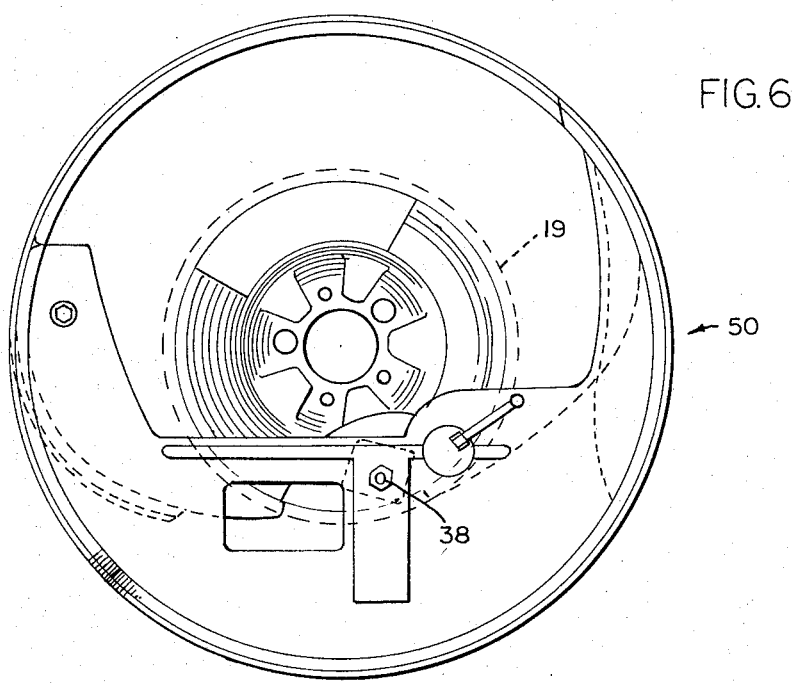
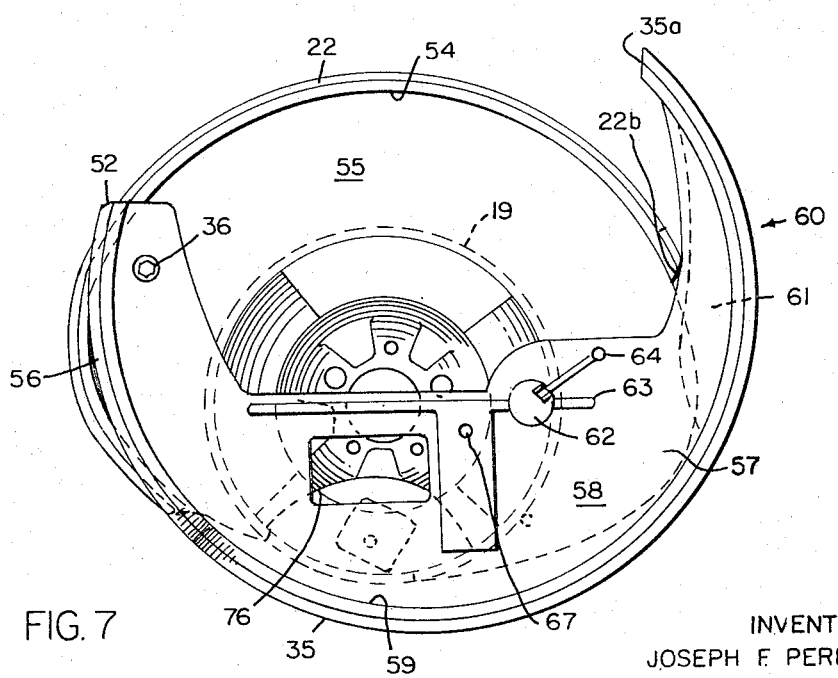

Jan. 3, 1967   J. F. PERRY   3,295,894
AUXILIARY AUTOMOBILE WHEEL SUPPORT
Filed April 23, 1965   6 Sheets-Sheet 5
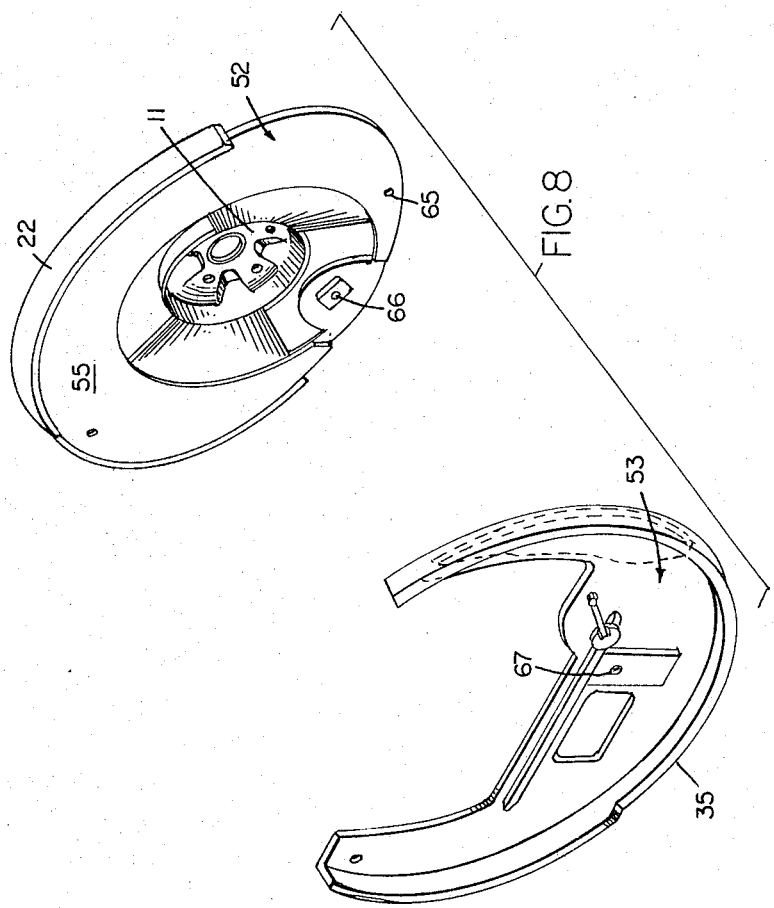
INVENTOR
JOSEPH F. PERRY
BY,
ATTORNEYS Jan. 3, 1967  J. F. PERRY  3,295,894
AUXILIARY AUTOMOBILE WHEEL SUPPORT
Filed April 23, 1965  6 Sheets-Sheet 6

INVENTOR
JOSEPH F. PERRY
BY,
Wolf, Greenfield + Hicken
ATTORNEYS

United States Patent Office 3,295,894
Patented Jan. 3, 1967

3,295,894
AUXILIARY AUTOMOBILE WHEEL SUPPORT
Joseph F. Perry, Stoughton, Mass., assignor of forty-five percent to Walter L. Reardon, Dorchester, Mass.
Filed Apr. 23, 1965, Ser. No. 450,352
19 Claims. (Cl. 301—38)

The present invention relates to a new and improved auxiliary wheel support and more particularly to a novel and improved auxiliary automobile wheel support for use in temporarily supporting a wheel having a flat pneumatic tire to allow travel for reasonable distances without dismounting the flat tire from a vehicle.

The annoyance, inconvenience and time losses encountered with flat pneumatic tires are well known to millions of motorists. Commonly, when a tire is punctured and flattened on the road, it is necessary to jack up an automobile, dismount the flat tire and replace it with a spare. In addition to the inconvenience, danger, time loss and annoyance caused by such a procedure, often the occupants of the car are not capable of performing the relatively heavy work involved in carrying out the tire changing procedure. Various automatic inflation devices, temporary patches and other expedients have been suggested to allow a motorist to proceed after having a flat without actually changing the flat tire. Most of these procedures are either expensive, inconvenient or require specific apparatus not ordinarily carried by the average motorist.

Accordingly an important object of this invention is to provide an auxiliary wheel support for a flat pneumatic tire which can be carried in place of a spare tire and which can be mounted without jacking up an automobile to provide support for the automobile until such time as the flat tire can be conveniently repaired.

Another object of this invention is to provide an auxiliary wheel support in accordance with the preceding object which can be easily mounted and dismounted rapidly with ease.

Still another object of this invention is to provide an auxiliary wheel support in accordance with the preceding objects which is relatively inexpensive and can be reused whenever needed.

According to the invention an automobile wheel support is provided for temporary support of a wheel having a flat pneumatic tire. The support has a centrally located hub carrying means for engaging the hub with a wheel with ease and without jacking up the car body. A first rim support frame is rigidly secured to the hub and carries a first rim portion. The first rim portion defines equal radii at points on a running surface thereof from a central axis of the hub. A second rim support frame adjoins the first rim support frame and carries a second rim portion adjoining the first rim portion to define the circumference of a circle having an axis coaxial with the hub axis. The second rim support frame is pivoted substantially at one end to the first rim support frame. Means are provided on the rim support frames for locking them in operative position.

Preferably the first rim support frame defines a supplementary wing means at ends of the first rim portion which permits mounting of the support with the first rim portion uppermost. Subsequent rotation of the first rim portion in a vertical plane to a lowermost position is permitted whereby the first rim portion fully supports the wheel and the second rim frame can be locked in position.

Figure 2:
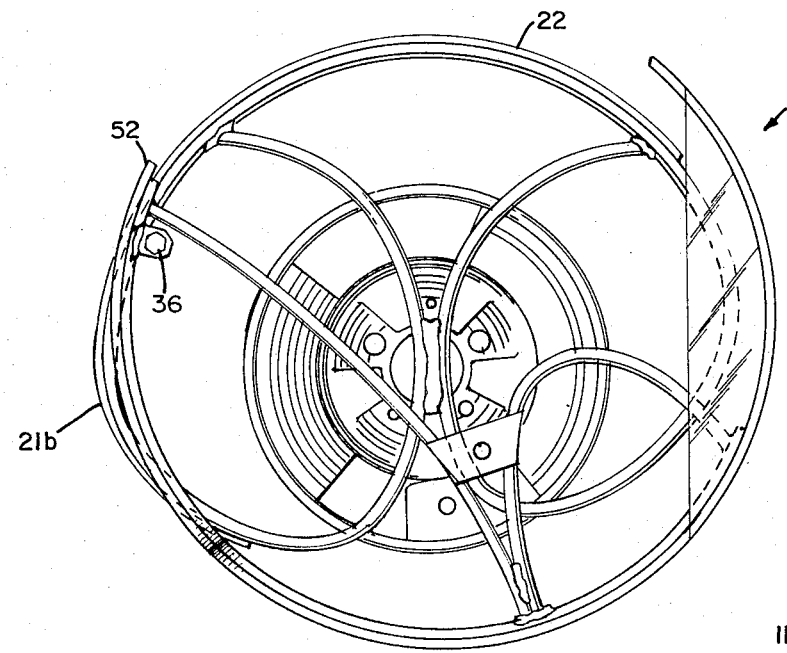
Figure 3:
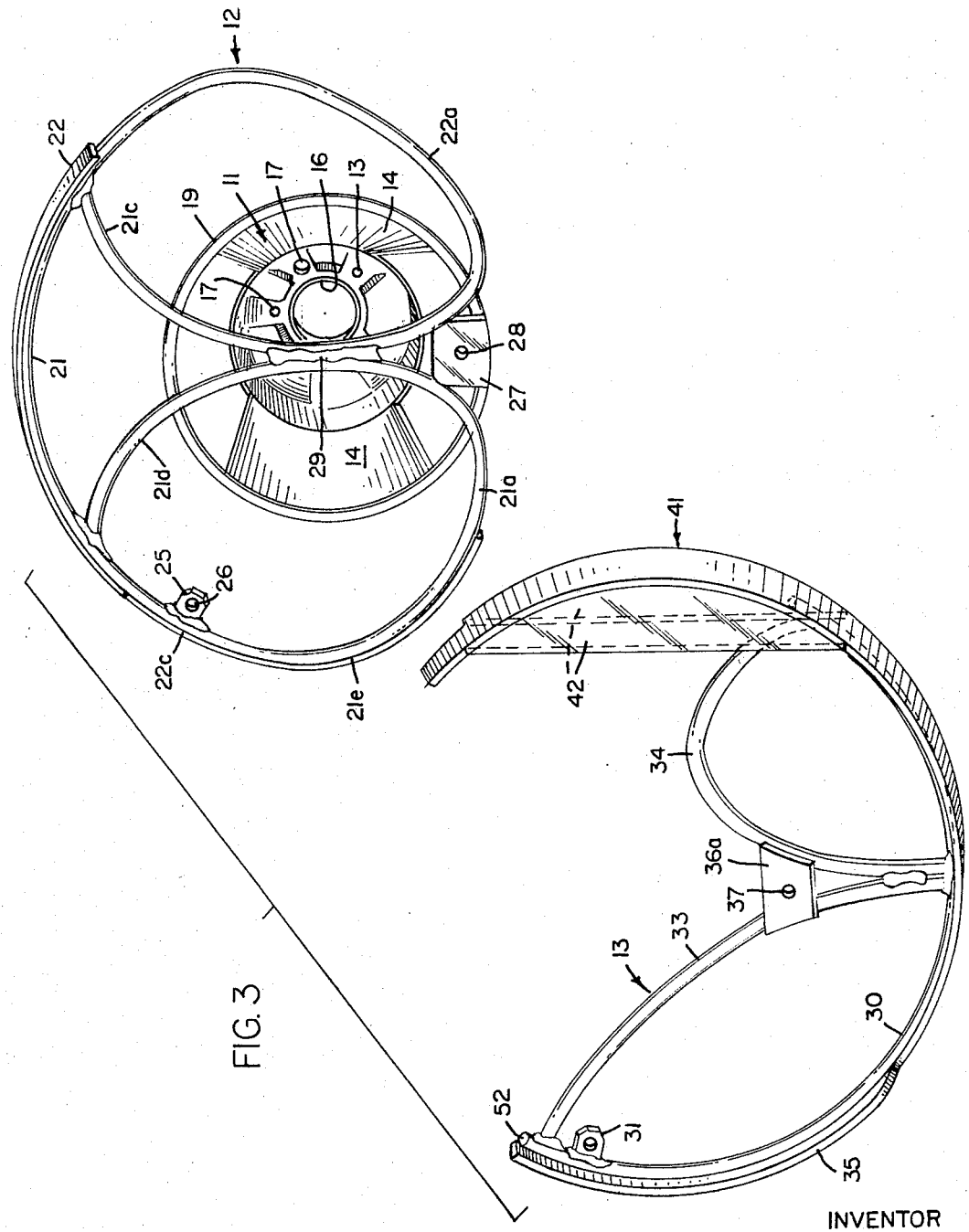
Figure 10:
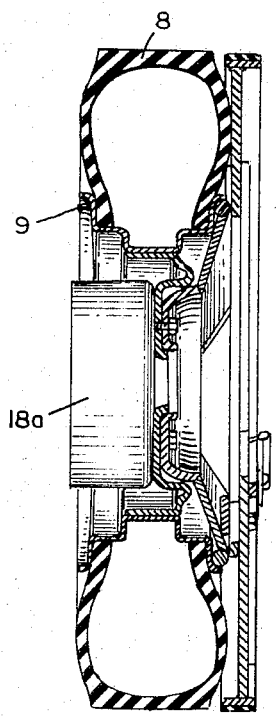
Figure 9:
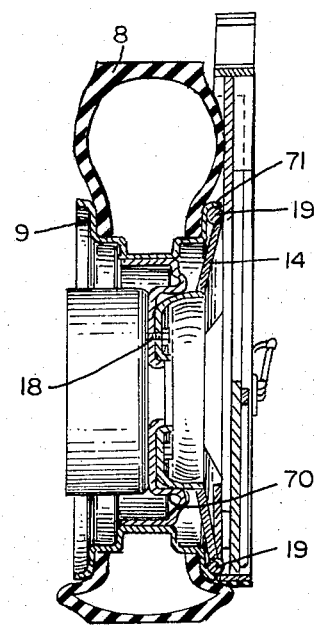

These and other features, objects and advantages of this invention will become more apparent from the following specification read in connection with the accompanying drawings in which like reference numerals indicate like parts:

FIG. 1 is a front view of one embodiment of this invention;
FIG. 2 is a front view thereof showing the device in a folded position;
FIG. 3 is an exploded view thereof;
FIG. 4 is a cross-sectional view thereof;
FIG. 5 is a cross-sectional view as shown in FIG. 4 with the auxiliary wheel support in its locked operative position;
FIG. 6 is a front view of an alternate embodiment of the invention;
FIG. 7 is a front view thereof showing the device in a folded position;
FIG. 8 is an exploded view thereof;
FIG. 9 is a cross-sectional view thereof; and,
FIG. 10 is a cross-sectional view as shown in FIG. 9 with the alternate embodiment in its locked operative position.

With reference now to the drawings and particularly FIGS. 1–3, one embodiment of the automobile wheel support of this invention is designated generally at 10 and has a hub 11, a hub rim engaging load member 19, a first rim support frame 12 and a second rim support frame 13.

The hub 11 acts as a means for mounting the wheel support on a wheel drum of an automobile over a conventional pneumatic tire 8 having a central wheel 9. The hub 11 preferably comprises cylindrical wings 14 which stand out from a base or backing plate 15. The plate 15 is provided with a central aperture 16 preferably having an axis which is coaxial with the axle of a wheel mounted on an automobile. A plurality of apertures 17 and preferably five equally spaced apertures are provided in the backing plate. The apertures 17 enable mounting of the hub 11 over a wheel as shown in FIGS. 4 and 5 by the use of bolts 18. Two of the five holes 17 are enlarged to permit hub 11 to fit over two wheel mounting nuts that remain in their fixed position during mounting operation. Three of the holes are smaller sized to permit three original drum bolts to be first removed and then reinserted to lock the plate to the wheel and drum. In cases where the drum 18a of the automobile is provided with studs rather than threaded recesses, the studs themselves may pass through aperture 17 and the original nuts provided to lock the hub in position over the wheel.

Preferably a generally circular hub rim engaging load member 19 is provided attached to the hub 11 at the ends of wings 14 and acts as a mounting surface for the first rim support frame 12. The particular design of the hub 11 may vary considerably so long as it provides for attachment of the wheel support over an automobile wheel and preferably spaces the rim portion of the wheel support slightly outwardly of a base plate such as 15. Member 19 is preferably circular and dimensioned to engage in the outer rim 71 of wheel 9, as best seen in FIGS. 3–5.

The first rim support frame 12 is rigidly mounted on the member 19 of the hub 11. As best seen in FIG. 3, rim support frame 12 preferably comprises a single bar 21 having a central curve adapted to support a rim member 22. The central portion of the bar 21 ends at wings 21a and 22a which in turn are curved inwardly at ends 21c and 21d and preferably welded or rigidly attached by a conventional means to the inner side of the rim carrying portion of the frame. The inwardly turned wing portions are preferably welded or otherwise attached by conventional means to the member 19 with the arcuate rim carrying central portion of bar 21 having a plurality of points equally spaced from the axis of the hub 11.

The rim portion 22 is preferably made of a semicylindrical iron or other curved metal plate welded or otherwise affixed to the frame. However, rim portion 22 can comprise a rubber or other shock resistant surfacing material if desired.

It is a feature of this invention that wing 21a is preferably slightly larger than 22a to continue the arc of the central portion and curve gently inwardly towards the hub to provide inclined surface 21e useful in mounting the wheel support of this invention as will be more fully described.

Frame 12 also carries a pivot block 25 rigidly attached as by welding to the frame as best seen in FIG. 3. Pivot block 25 has a bore 26 passing therethrough substantially parallel to the axis of hub 11.

A locking plate 27 is rigidly attached to each of the wing portions 21a and 22a and carries bore 28 for facilitating locating and locking of the second rim support frame 13 in position with respect to the first rim support frame 12.

Preferably the rim portion 22 has a circular arc, covering the perimeter of a circle through the axis of hub 11, which is of smaller length than the outer arc of the bar 21 along with wing portions 21a and 22a.

In the preferred embodiment the inwardly turned ends of the bar meet at a point 29 and are welded together at this point to provide further support for the rim portion against compression forces.

The second rim support frame 13 comprises curved bar support member 30 having an arcuate configuration and being generally circular. Frame 13 overlies and is pivoted on frame 12 by means of a lug 31 fixed to the bar 30 at one end with pivot pin 36 interconnecting the first and second frames. Curved support bars 33 and 34 are provided each having ends welded or otherwise rigidly affixed to the bar 30. Support members 33 and 34 protect the rim portion 35 of the second frame against compression in a radial direction. A locking plate 36a is welded or otherwise affixed between the support bars 33 and 34 as best seen in FIG. 3 and carries a bore 37 positioned and arranged to overlie bore 28 when the two frame members are locked in their working position as shown in FIG. 1. The two frame members are locked together by a bolt 38 to rigidify the entire structure.

Rim portion 35 is preferably constructed of the same or similar material to rim portion 22 and together with rim portion 22 completes a circle forming the load bearing peripheral rim of the wheel support of this invention. The left hand end of rim 35, as seen in FIG. 3, is cut back to correspond with notch 22e of rim 22 and allow for pivoting of the frame 13 over frame 12.

The second end of the rim 35 carries a hooded member 41. Hood 41 is made up of front and rear flat plates 42 preferably welded to a portion of the cylindrical rim 35 as best shown in FIG. 3. The hood 41 aids in locking the members together and maintaining the rim portions 22 and 35 in alignment during use of the device since portion 22a is slidingly received between plates 42.

While a specific construction of the support bars, rims and locking devices have been described, it should be obvious that many variations are possible. For example, the specific structure of the support frames can be varied. While it is preferred that bar 21 be integral with its wings, separate pieces can be employed. Similarly the bolt and nut arrangement for locking the frames together can be varied by the use of any conventional joining means as can the structure of the pivot lugs 25 and 31. Preferably all components of the first and second frame are made out of a rigid metal such as steel although other metals or materials can be used.

With reference now to the use of the wheel support, as best seen in FIG. 2, the wheel support is first pivoted on pivot pin 36 to its fully collapsed position. In this position the wheel support is placed with rim portion 22 uppermost and hub 11 is bolted to the wheel of a car drum preferably through the rim of a flat tire as best seen in FIG. 4. Bolts 18 may be repositioned by removing only two or three of the conventional mounting lugs used in attaching the conventional pneumatic tire rim 9 to the drum. Then bolts 18 are placed in the corresponding holes to firmly fix the wheel support to the drum 18a. Since some of the normal mounting lugs 18 are left and base plate 15 overlies these lugs, the wheel 9 need not be removed from the car nor need the car be jacked up to apply the wheel support of this invention.

After the tire support is mounted as shown in FIG. 2, the car is rolled forward so that wing portion 21e acts as a support until rim portion 22 is rotated in a vertical plane to underlie the wheel and portion 22 firmly supports the wheel. When rim portion 22 is in its lowermost position, rolling of the car will have caught end 52 of the second frame 13 pushing the second frame into its secured position. When the second frame is positioned as shown in FIG. 1, lock nut 38 is inserted through bores 37 and 28 to firmly lock the tire support and provide a rim about 360° of the periphery thereof.

The hooded end of frame 13 never extends substantially above the upper surface of tire 8 even in the position shown at FIG. 2. Thus there is no problem of the frame 13 touching the underbody of the car during mounting or use. The diameter of the rim as shown in FIGS. 1 and 5 is substantially equal to the outer diameter of the tire 8 to prevent damage to the tire or car underbody in use.

While a specific embodiment of this invention has been shown and described above, it should be understood that many variations thereof are possible. For example, the specific means for attaching the hub 11 to a wheel or car drum may vary. Although it is preferred that each of the first and second frames 12 and 13 respectively lie in overlying parallel planes, in some cases, the support bars of each frame can be curved inwardly towards a car body so that the rim portions 22 and 35 are positioned substantially in a plane coinciding with the plane of the base plate 15.

Turning now to an alternate preferred embodiment of the invention, there is illustrated in FIGS. 6–10 a wheel support generally designated at 50. The wheel support 50 is basically similar to wheel support 10 and comprises many of the same structures and principles. In these figures, parts identical with those shown in FIGS. 1–5 are correspondingly numbered. The wheel support 50 has a hub 11, a hub rim engaging load member 19, a first rim support frame 52 and a second rim support frame 53. It will readily be seen from the drawings that the only substantial change in the second embodiment over the first embodiment is the unitary construction of the rim support frames as flat plates rather than struts. The frame 53 is mounted to move in a plane parallel to frame 52 about a pivot point to collapse and expand to the working condition.

The hub rim engaging load member 19 is welded or otherwise secured to the first support frame 52 as best shown in FIGS. 6 and 7. The member 19 is concentric with the outer rim formed by portions 22 and 35 when the wheel support is in its operative position. Thus, as in the first embodiment member 19 is positioned adjacent the outer lip or flange 71 of the wheel 9 when bolts 18 are in place. Member 19 bears the brunt of the load applied to the wheel support by the weight of the car. In addition, hub 11 is preferably of a diameter such as to fit adjacent a second wheel recess wall 70 as best shown in FIG. 9 and may also carry a portion of the load on the wheel support.

The first frame support 52 preferably comprises a flat steel plate 55 having an arcuate edge 54 underlying rim 22 and acting in the same manner as bar 21. A wing portion of the plate 55 is shown at 56 and functions as does wing portion 21e when the wheel support is mounted on a flat tire in the position shown in FIG. 7. A second wing portion 57 of the plate 55 acts as a stop means for preventing travel of the second frame support beyond the point shown in FIG. 7. Pivot pin 36 is provided through suitable bores in the first and second support frames to allow pivoting of the second frame member 53 with respect to the first frame member 52 as described with relation to wheel support 10.

The second frame support 53 comprises a base 58 of a flat steel plate and lies parallel to base plate 55. Plate 58 provides an outer edge 59 corresponding with the function of bar 30. A hood 60 is provided at the right hand end of the device as shown in FIG. 7 and comprises a portion of plate 58 along with a rear parallel spaced plate 61. The wing portion 57 of plate 55 is positioned to slide within the hood and prevent the second frame member 53 from extending upwardly too far above the first frame member 52 as best seen in FIG. 7. Ends of the rims 35 and 22 at 35a and 22b are angularly cut to allow upward movement of the second frame member as in the first embodiment.

Preferably a spring loaded dog 62 extends through the second frame support plate 58 and is biased continuously against the first plate 55. The dog 62 may be of any conventional spring loaded type and is preferably positioned in a slot 63 and has a release handle 64. This feature allows the second support frame to slide over the first support frame until it is in the operative position shown in FIG. 6 whereupon the dog locks with a suitable aperture 65 on the first plate 55 and positions the support frames with respect to each other. A bore 66 is provided to align with bore 67 upon proper positioning of the frame support members in the operative position shown in FIG. 6 whereupon bolt 38 can be used to positively lock the elements together. Preferably a cut-out 76 is provided for access to the bolts holding the wheel support to the drum when the device is collapsed.

The wheel support 50 operates in the same manner as wheel support 10. Thus, the wheel support is collapsed as shown in FIG. 7 and bolted to the hub of an automobile over a wheel such as 9. The automobile is moved to allow portion 56 to act as a lever until the left hand end of the second frame support member is forced downwardly by turning of the wheel to expand the device into the position shown in FIG. 6. At this point, the spring loaded dog locks in position. Bolt 38 may then be applied to firmly position all elements of the assembly and ready the car for travel on the wheel support 50.

Although two specific embodiments have been shown and described, it should be understood that many variations are possible. The specific shape of the frame members can obviously vary as can the materials used. In some cases, the means of attachment to the hub can be other than holes provided for bolt passage to the drum. For example, an expanding cam operated hub 11 can be used to lock the hub against the wheel. Other jack or cam operated locking means can be employed. The specific spring loaded lug or dog 62 described acts as an additional safety factor and need not be employed. Similarly other clamping and latching attachments can be used to lock the device in position.

Therefore this invention is to be limited only by the spirit and scope of the appended claims.

What is claimed is:
1. An automobile wheel support for temporarily supporting a wheel having a flat tire, said support comprising,
 a centrally located hub carrying means for engaging said hub with a wheel,
 a first rim support frame rigidly secured to said hub and carrying a first rim portion,
 said first rim portion defining equal radii at points therealong from a central axis of said hub,
 a second rim support frame adjoining said first rim support frame and carrying a second rim portion adjoining said first rim portion to define the circumference of a circle having an axis coaxial with said hub axis,
 said second rim support frame carrying pivot means for pivoting said first rim support frame substantially in a plane to a collapsed and an operating position,
 means on said second rim support frame for locking said first and second support frames in operative position.

2. An automobile wheel support in accordance with claim 1 wherein said first rim support frame comprises stop means extending inwardly and beyond said first rim portion for preventing movement of said second rim support frame with respect to said first rim support frame beyond a predetermined point.

3. An automobile wheel support in accordance with claim 1 wherein said first rim support frame defines supplementary wing means at ends of said first rim portion for permitting mounting of said support with said first rim portion uppermost and subsequent rotation of said first rim portion in a vertical plane to a lowermost position fully supporting said wheel whereby said second rim frame can be locked in position.

4. An automobile wheel support in accordance with claim 3 wherein said second rim support frame carries a hood constructed and arranged to coact with one of said wing means to align said first rim portion with said second rim portion during pivoting movement of said portions with respect to each other.

5. An automobile wheel support in accordance with claim 3 wherein one wing means of said first rim support frame provides a load bearing surface for use in supporting said wheel when said wheel support is collapsed and rotated to its operative position.

6. An automobile wheel support in accordance with claim 1 wherein said first rim support frame comprises a hub rim engaging load means secured to said first frame and constructed and arranged to engage a rim of said wheel when said automobile wheel support is mounted.

7. An automobile wheel support in accordance with claim 6 wherein said rim engaging load means has a generally circular configuration and is secured to said centrally located hub by flanges extending outwardly of said hub.

8. An automobile wheel support in accordance with claim 1 wherein said centrally located hub carries a plurality of apertures defining at least two different diameters whereby said hub can be applied on said wheel without dismounting said wheel from an automobile.

9. An automobile wheel support for temporarily supporting a wheel having a flat tire,
 said support comprising, a centrally located hub means comprising means for engaging said hub with a wheel of an automobile,
 said hub having a generally circular wheel rim engaging load member affixed thereto,
 a first rim support frame rigidly secured to said rim engaging load member and carrying a first rim portion,
 said first rim portion defining equal radii at points therealong from a central axis of said hub,
 a second rim support frame adjoining said first rim support frame and lying in a plane generally parallel to said first rim support frame and carrying a second rim portion adjoining said first rim portion to define the circumference of a circle having an axis substantially coaxial with said hub axis,
 said second rim support frame being pivoted at a first end thereof to said first rim support frame for sliding movement of said frames with respect to each other, said first end extending beyond said first rim portion when said wheel support is collapsed prior to being positioned in its operative position, said first rim support frame carrying a stop means for limiting said sliding movement,
 said second rim support frame carrying means for cooperating with corresponding means on said first rim support frame for locking said first and second rim support frames in operative positions whereby said first and second rim portions substantially define a circle.

10. An automobile wheel support in accordance with claim 9 wherein said first rim support frame and said second rim support frame each comprise metallic support bars underlying said first and second rim portions and preventing radial contraction of said wheel support under load.

11. An automobile wheel support for temporarily supporting a wheel having a flat tire and permitting travel on said support for prolonged periods,
  said support comprising a hub, said hub carrying means for engaging said hub with a wheel,
  a first rim support frame rigidly secured to said hub through a wheel rim engaging load member and carrying a first load supporting rim portion,
  said first rim support frame comprising a flat metallic plate,
  said first rim portion defining equal radii at points therealong on an edge of said plate from a central axis of said hub,
  a second rim support frame adjoining first rim support frame and comprising a second metallic plate adapted to move in a plane substantially parallel to said first plate and carrying a second rim portion adjoining said first rim portion to substantially define the circumference of a circle having an axis coaxial with said hub axis,
  said second rim support frame being pivotably mounted at a first end thereof on said first rim support frame to permit said movement,
  means on said second rim support frame for locking said first and second rim support frames in operative position.

12. An automobile wheel support in accordance with claim 11 wherein said hub defines at least two different sized apertures for mounting said automobile wheel support on an automobile wheel.

13. An automobile wheel support in accordance with claim 11 wherein said locking means includes an automatic means for positioning said first rim support frame in operative relation with said second rim support frame upon preselected movement of said frames with respect to each other.

14. An automobile wheel support in accordance with claim 11 wherein said first rim support frame defines supplementary wings at ends of said first rim portion for permitting mounting of said support with said first rim portion uppermost and lying substantially in a vertical plane to permit subsequent rotation of said first rim portion in said vertical plane to a lowermost position with respect to an automobile wheel whereby said first rim portion fully supports said wheel and said second rim support frame can be locked in operative position.

15. An automobile wheel support in accordance with claim 11 wherein said first rim support frame defines at least one wing means extending outwardly of said second rim portion when said support is collapsed to provide a bearing surface for use during mounting of said support on an automobile wheel.

16. An automobile wheel support comprising first and second coacting rim support frames.
  said frames each carrying a mating portion of an encircling peripheral rim,
  means for inwardly collapsing said frames in a substantially planar pivoting action and alternately locking said frames in operative position whereby said rim forms a circle of 360 degrees,
  means for limiting collapsing movement of said frames and associated rim portions,
  and hub means joined to said first rim support frame for mounting said frames on an automobile wheel over a flat tire.

17. An automobile wheel support for temporarily supporting a wheel having a flat tire,
  said support comprising a centrally located hub means comprising means for engaging said hub with a wheel of an automobile,
  said hub having a generally circular wheel rim engaging load member affixed thereto,
  a first rim support frame rigidly secured to said rim engaging load member and carrying a first rim portion,
  said first rim portion defining equal radii at points therealong from a central axis of said hub,
  a second rim support frame adjoining said first rim support frame and lying in a plane generally parallel to said first rim support frame and carrying a second rim portion adjoining said first rim portion to define the circumference of a circle having an axis substantially coaxial with said hub axis,
  said second rim support frame being pivoted at a first end thereof to said first rim support frame to move in a plane substantially parallel to said first rim support frame, said first end extending beyond said first rim portion when said wheel support is collapsed prior to being positioned in its operative position,
  and a second end of said second rim support frame provided with a hood comprising substantially parallel plates which act as a guide for said second rim support frame during said pivoting movement to assure proper alignment of said first rim portion with said second rim portion during said movement,
  said second rim support frame carrying means for cooperating with corresponding means on said first rim support frame for locking said first and second rim support frames in operative positions whereby said first and second rim portions substantially define a circle.

18. An automobile wheel support in accordance with claim 11 wherein said first rim support frame comprises stop means extending inwardly and beyond said first rim portion for preventing movement of said second rim support frame with respect to said first rim support frame beyond a predetermined point.

19. An automobile wheel support in accordance with claim 11 and further comprising stop means for limiting said pivoting movement to limit the collapsed position of said wheel support.

References Cited by the Examiner

UNITED STATES PATENTS

| | | | |
|---|---|---|---|
| 1,823,660 | 9/1931 | Nehin | 301—39 |
| 1,854,636 | 4/1932 | Westbrook | 301—38 |
| 2,257,543 | 9/1941 | Toby | 301—39 |
| 3,208,798 | 9/1965 | Peters | 301—38 |

FOREIGN PATENTS

| | | |
|---|---|---|
| 146,736 | 7/1931 | Switzerland. |

BENJAMIN HERSH, *Primary Examiner.*

RICHARD J. JOHNSON, *Examiner.*